US006839437B1

(12) United States Patent
Crane et al.

(10) Patent No.: US 6,839,437 B1
(45) Date of Patent: Jan. 4, 2005

(54) METHOD AND APPARATUS FOR MANAGING KEYS FOR CRYPTOGRAPHIC OPERATIONS

(75) Inventors: Michael A. Crane, Austin, TX (US); Sohail H. Malik, Galthersburg, MD (US); John Clay Richard Wray, Chelmsford, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/494,876

(22) Filed: Jan. 31, 2000

(51) Int. Cl.$^7$ ................................................ H04L 9/00
(52) U.S. Cl. ..................... 380/286; 380/277; 380/282; 713/167; 713/171; 713/172
(58) Field of Search ................. 380/286, 282, 380/277, 45; 713/175, 187, 159, 167, 171, 172, 163

(56) References Cited

U.S. PATENT DOCUMENTS

| | | | | |
|---|---|---|---|---|
| 5,513,261 A | * | 4/1996 | Maher | 380/277 |
| 5,748,736 A | * | 5/1998 | Mittra | 713/163 |
| 6,625,734 B1 | * | 9/2003 | Marvit et al. | 713/201 |
| 6,711,264 B1 | * | 3/2004 | Matsumoto et al. | 380/283 |

OTHER PUBLICATIONS

Sun Microsystems. "How to Implement a Provider for the Java Cryptography Architecture", Sep. 1998.*
Sun Microsystems. "keytool—Key and Certificate Management Tool", 1998 (part of Java 1.2).*
Wood, Matthew. "The CSSM PKCS #11 Adaptation Layer", Oct. 1998.*
Knudsen, Jonathan, Java Cryptography, O'Reilly & Associates 1998, p. 79.*
Intel Corporation, Common Security Services Manager. Service Provider Interface (SPI) Specification, Release 1.0, Oct. 1996.*
Intel Corporation,"Intel's Common Data Security Architecture", Dec. 11, 1996.*
Sun Microsystems, Java Platform 1.2 (3 documents): "jarsigner–JAR Signing and Verification Tool", "Java Platform 1.2 API Specification: Class KeyStore" and "The Java Virtual Machine Specification", § 2.10 and § 3.6.*

* cited by examiner

Primary Examiner—Gregory Morse
Assistant Examiner—Michael J. Simitoski
(74) Attorney, Agent, or Firm—Duke W. Yee; Jeffrey S. LaBaw; Stephen J. Walder, Jr.

(57) ABSTRACT

A cryptographic system for use in a data processing system. The system includes a security layer and a plurality of cryptographic routines, wherein the plurality of cryptographic routines are accessed through the security layer. Also included is a keystore and a keystore application program interface layer coupled to the security layer. The keystore application program interface layer receives a call from an application to perform a cryptographic operation, identifies a routine, calls the routine to perform the cryptographic operation, receives a result from the routine, and returns the result to the application.

24 Claims, 3 Drawing Sheets

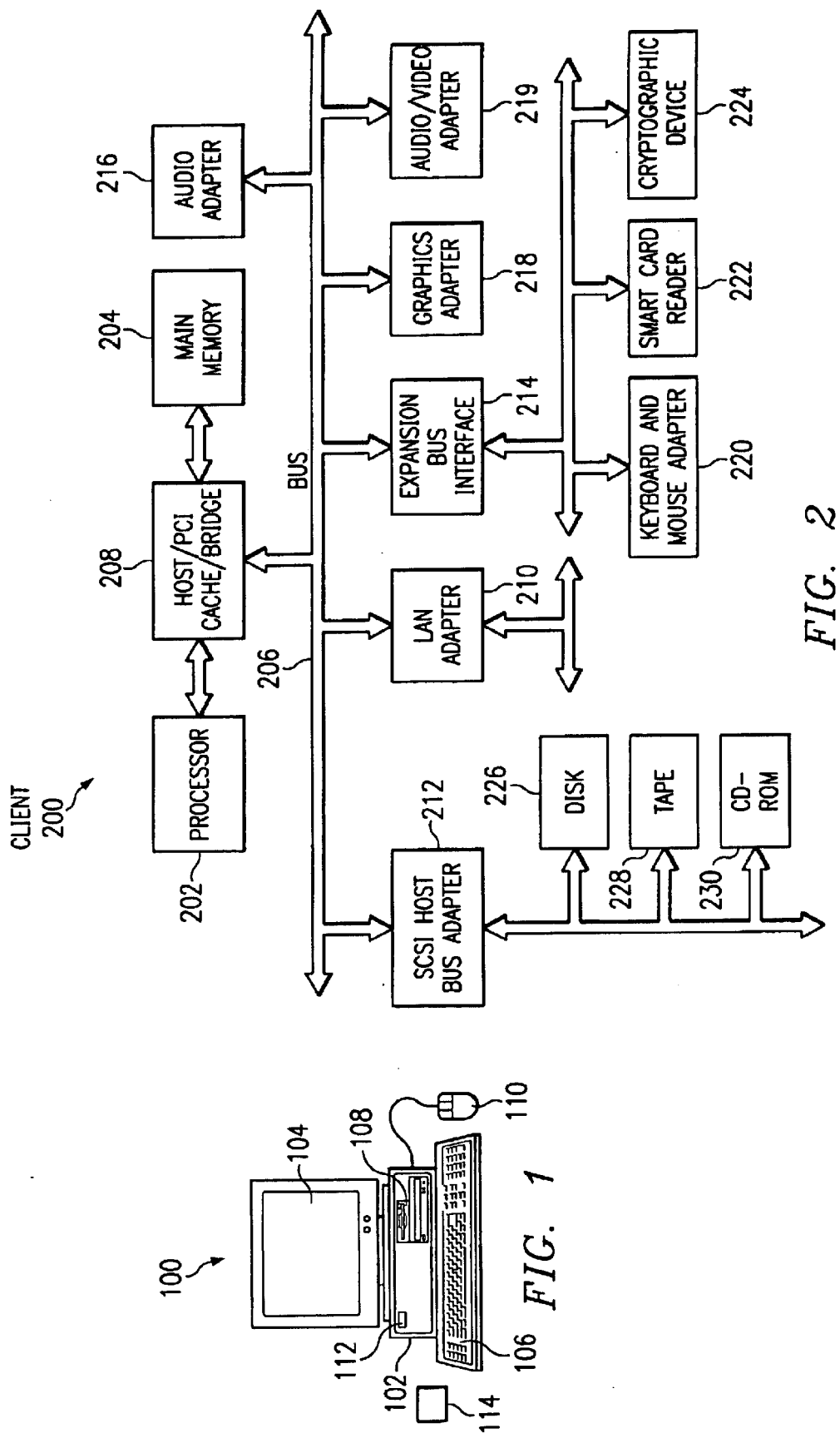

METHOD AND APPARATUS FOR MANAGING KEYS FOR CRYPTOGRAPHIC OPERATIONS

BACKGROUND OF THE INVENTION

1. Technical Field

The present invention relates generally to an improved data processing system and in particular to a method and apparatus for facilitating cryptographic operations. Still more particularly, the present invention provides a method and apparatus for managing keys used in cryptographic operations.

2. Description of Related Art

Public Key Infrastructure (PKI) defines the policies and procedures for establishing a secure method for exchanging information within an organization, an industry, a nation, or worldwide. PKI includes the use of certification authorities (CAs) and digital signatures, as well as all the hardware and software used to manage the process. In PKI, cryptography is used to provide for security in transactions and transfers of data. Cryptography involves the conversion of data into a secret code for transmission over a public network. The original text, or plaintext, is converted into a coded equivalent called ciphertext via an encryption algorithm. The ciphertext is decoded (decrypted) at the receiving end and turned back into plaintext.

The encryption algorithm uses a key, which is a binary number that is typically from 40 to 128 bits in length. The greater the number of bits in the key (cipher strength), the more possible key combinations and the longer it would take to break the code. The data is encrypted or "locked" by combining the bits in the key mathematically with the data bits. At the receiving end, the key is used to "unlock" the code and restore the original data. These operations are used in PKI, for example, to generate key pairs, add a certificate, delete a certificate, retrieve a certificate, sign data, verify a signature, and verify proof of possession of a private key.

In providing a framework for these types of operations, the Common Data Security Architecture (CDSA) has been developed. CDSA is a layered set of security services addressing communications and data security problems in the emerging Internet and intranet application space.

More specifically, CDSA is a set of layered services and associated programming interfaces, providing an integrated but dynamic set of security services to applications. The lowest layers begin with fundamental components, such as cryptographic algorithms, random numbers, and unique identification information. CDSA is designed to be used with cryptography operations. The layers build up to digital certificates, key management mechanisms, integrity and authentication credentials, and secure transaction protocols in higher layers.

A framework of application program interfaces (APIs) is present in CDSA. Applications requesting cryptographic operations, such as those involving Public Key Infrastructure (PKI), access a CDSA layer through API calls. Presently, each application must be able to translate cryptographic operations into the appropriate API calls to the CDSA layer. A single cryptographic operation often may require multiple calls to the CDSA layer. For example, a sign operation includes the following parameters: the handle to the keystore, the password to unlock the keystore, and the slot id, which is a way to specify one of several smart card devices on a machine. The call for the sign operation includes an index, which is the hash of the public key that all associated objects have; the type of signature to use (i.e. RSA); and the data to sign. The index is also called a key identifier. The sign operation returns the signature. Currently, application programmers are required to understand all of the different calls needed to perform cryptographic operations in designing an application using cryptographic operations.

Therefore, it would be advantageous to have an improved method and apparatus for performing cryptographic operations using a set of security services.

SUMMARY OF THE INVENTION

The present invention provides a cryptographic system for use in a data processing system. The system includes a security layer and a plurality of cryptographic routines, wherein the plurality of cryptographic routines are accessed through the security layer. Also included is a keystore and a keystore application program interface layer coupled to the security layer. The keystore application program interface layer receives a call from an application to perform a cryptographic operation, identifies a routine, calls the routine to perform the cryptographic operation, receives a result from the routine, and returns the result to the application.

Further, updates to objects associated with the cryptographic operation may be made in response to the result. The identification of the routine and the keystore may be made by accessing a data structure containing an identification of the routine and the keystore.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a pictorial representation of a data processing system in which the present invention may be implemented in accordance with a preferred embodiment of the present invention;

FIG. 2 is a block diagram of a data processing system is shown in which the present invention may be implemented;

DETAILED DESCRIPTION OF THE PREFERRED EMBODIMENT

Figure 3:
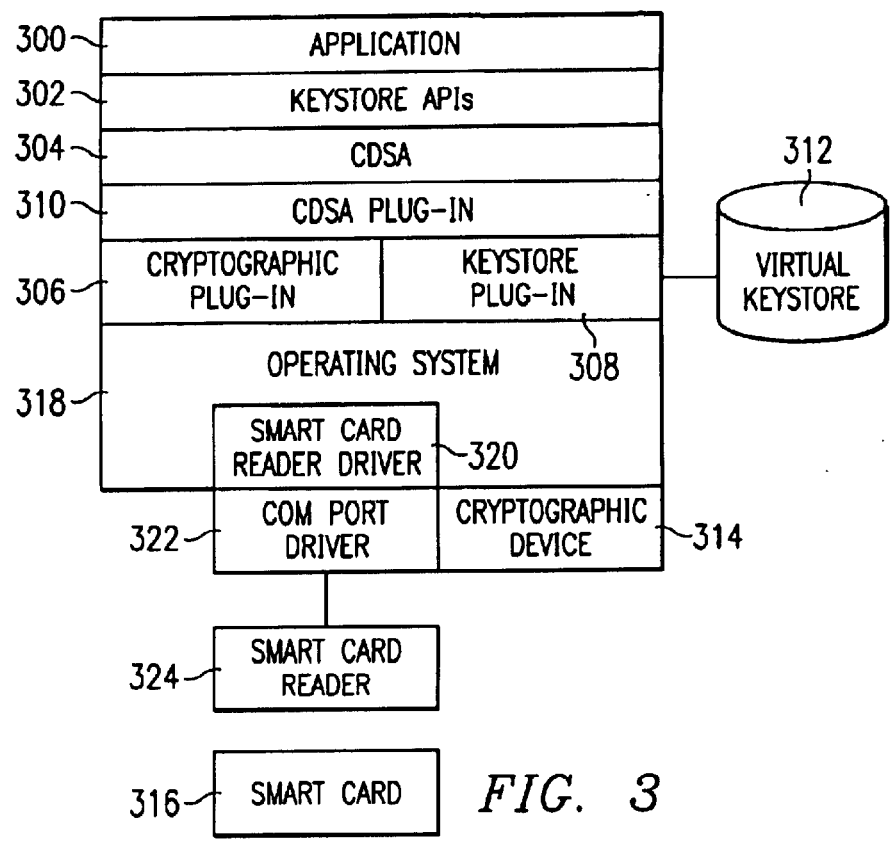
FIG. 3 is a block diagram of components used in performing cryptographic operations and managing keys in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 102, a video display terminal 104, a keyboard 106, storage devices 108, which may include floppy drives and other types of permanent and removable storage media, and mouse 110. Computer 100, in this example, also includes a smart card reader 112, which is configured to receive and access smart card 114. In this example, smart card reader 112 is integrated into system unit 102. In other implementations, smart card reader 112 may be located externally from system unit 102.

Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots.

Expansion bus interface 214 provides a connection for a keyboard and mouse adapter 220, smart card reader 222, and cryptographic device 224. Smart card reader 222 is used to receive smart cards, which may store cryptographic keys and perform cryptographic operations. Cryptographic device 224 provides a hardware device used to perform cryptographic operations and store keys.

SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented operating system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The present invention provides a method, apparatus, and computer implemented instructions for requesting cryptographic operations using a set of security services. The mechanism of the present invention allows for an application to perform cryptographic operations, especially those involving keys, without having to directly manage the keys. A set of functions are provided to allow for digital certificates and keys to be created, stored, managed, and used in cryptographic operations. The functions are called through a set of APIs interposed between the application and the security services. In these examples, the security services are performed using CDSA. These functions are called through a set of semantics, which are logical for operations requested by the application. For example, an application may perform a sign operation by sending a call in which the function is "sign" and include the following parameters: the handle to the keystore, the password to unlock the keystore, and the slot id, which is a way to specify one of several smart card devices on a machine. The call for the sign operation includes an index, which is the hash of the public key that all associated objects have; the type of signature to use (i.e. RSA); and the data to sign. The index is also called a key identifier. The sign operation returns the signature. The function would make the necessary calls to accomplish the function.

In these examples, access to the keystore is protected. Most keystores will protect access to operations by requiring a caller to know the password to use the keystore. For example, a smart card has a personal identification number (PIN) that is used to log in before other operations can be accomplished. Other keystores could require other information to allow access. This information may be, for example, biometric. The mechanism of the present invention protects access to the keystore by maintaining the password or other information needed to access the keystore. The keystore itself is managed using CDSA and the mechanism of the present invention. In the depicted examples, the password or other information may be collected when the data processing system is started and placed in a protected memory for use as needed. The mechanism of the present invention maintains the overall security of the system, while providing a semantic interface between the application and the security services.

With reference now to FIG. 3, a block diagram of components used in performing cryptographic operations and managing keys is depicted in accordance with a preferred embodiment of the present invention. Application 300 sends a request for an operation to keystore APIs 302 for cryptographic operations and to manage keys. A request received by keystore APIs 302 is interpreted and translated into one or more appropriate API calls to Common Data Security Architecture (CDSA) layer 304. When keystore APIs 302 receives a request for an operation from application 300, a number of different calls may be required to CDSA layer 304 in order to accomplish the operation and to provide for any updates or cleaning up and releasing of resources used during the operation. An operation requested by application 300 typically does not have a one to one correspondence with CDSA layer 304. This situation requires keystores APIs 302 to interpret the request and make the appropriate calls to complete the operation for application 300. In this manner, the mechanism of the present invention eliminates the need to write code specifically directed towards CDSA functions and semantics.

IBM KeyWorks Toolkit is an example of a software product that implements CDSA and is available from International Business Machines Corporation. This toolkit consists of a framework and service provider add-in modules. A framework is a set of common interfaces that can have plug-ins which can have multiple providers using the same interfaces. A service provider module is a piece of software or code that fits under the framework and interacts with the framework to provide a particular service. For example, a service provider module may provide cryptographic services for a smart card.

The calls may involve functions provided by cryptographic plug-in 306 or keystore plug-in 308. These plug-ins interface to CDSA 304 through CDSA plug-in 310. Cryptographic plug-in 306, keystore plug-in 308, and CDSA plug-in 310 are plug-ins that are designed to interact with CDSA layer 304. These plug-ins may be created by various sources and are part of the CDSA framework.

These plug-ins are designed to perform operations with keys located in various locations. In this example, keys may be located in keystore, such as virtual keystore 312, cryptographic device 314, or smart card 316. Virtual keystore 312, in these examples, is a file containing keys, which may be managed through keystore plug-in 308 or used in cryptographic operations through cryptographic plug-in 306. Cryptographic device 314 is a cryptographic device, such as cryptographic device 224 in FIG. 2. Keys may be stored in cryptographic device 314, and cryptographic operations also may be performed by this device. Smart card 316, in this example, is a credit card with a built-in microprocessor and memory. Smart card 316 is capable of storing keys and performing cryptographic operations.

Access to virtual keystore 312 may be accomplished directly using keystore plug-in 308. Access to cryptographic device 314 is facilitated through operating system 318, while access to smart card 316 occurs through operating system 318, smart card driver 320, communications port 322, and smart card reader 324.

Application 300 may access keys in different locations, such as virtual keystore 312, cryptographic device 314, and smart card 316, to perform cryptographic operations and to manage keys. Keystore APIs 302 allow application 300 to request cryptographic operations without having to know the calls that have to be made to CDSA layer 304 to perform the operations. For example, the operations may involve cryptographic operations by cryptographic plug-in 306, cryptographic device 314, or smart card 316. Application 300 is not required to identify the particular component performing the operation. Instead, application 300 requests a cryptographic operation and provides the keys and other parameters for the operation. Keystore APIs 302 identifies the appropriate component and generates the appropriate calls to CDSA 304 to execute the requested operation by application 300. Further, keystore APIs 302 allows for these cryptographic and management operations to be made without requiring applications 300 to identify the location of the key.

In essence, keystore APIs 302 makes the appropriate calls to the plug-ins to perform cryptographic operations and deal with data to store and manage keys in the various locations.

In these examples, accesses to a keystore may be made by referring to objects in two formats. The keystore may store various attributes as discussed below.

First, the key index (a.k.a. key identifier) can be used to refer to keys. This is a value that can be calculated, by performing a hash function on the public key contained in the public key object or the certificate. In this way, if a certificate or public key is involved, the key index for all objects associated with these keys can be determined. The second format is the use of a label. This label is selected by the calling application to be associated with the object and is needed for data objects in the keystore that are not associated with a key. The application then must manage the labels from the keystore.

The functions provided by the mechanism of the present invention may provide a keystore function to any digital certificate application. The process for each function handled by keystore APIs 302 contains fairly similar steps, as the functions must map to the CDSA interfaces from the semantics that are usable by the application. The application calls a function in keystore APIs 302. The function must attach to the proper CDSA plug-in(s) and manage the translation from semantics used by application 300 to CDSA semantics for CDSA layer 304. The CDSA semantics used by keystore APIs 302 require knowledge of the underlying keystore. The semantics include the format of the calls and may include the protocol itself. The mechanism of the present invention only requires application 300 to pass parameters and the actual format and protocol are handled by keystore APIs 302.

For example, the semantics of APIs for keys sent to CDSA look very much like PKCS#11 parameter semantics. PKCS#11 is a cryptographic token interface standard under RSA Data Security, Inc., Redwood City, Calif. PKCS#11 is a standard that specifies an API, called Cryptoki, to devices which hold cryptographic information and perform cryptographic functions. With the mechanism of the present invention, application 300 is not required to have any knowledge about the semantics or form of how the parameters are passed to and from CDSA layer 304. In these examples, PKCS#11 semantics are used to pass the keystore data because other plug-ins under CDSA can be written to accept these semantics for keystores that provide more function and storage. This format can provide much more robust function for the keystore, without having to change logic in the application.

Thus, the present invention allows an application to use a keystore without requiring the application to contain the format or semantics to call security services in CDSA. Additionally, the application is not required to know the method by which the keystore semantics are passed by CDSA. In the depicted examples, the keystore APIs use PKCS#11 as the method, as well as semantics or formats for PKCS#11 to pass parameters to CDSA for a keystore.

Figure 4:
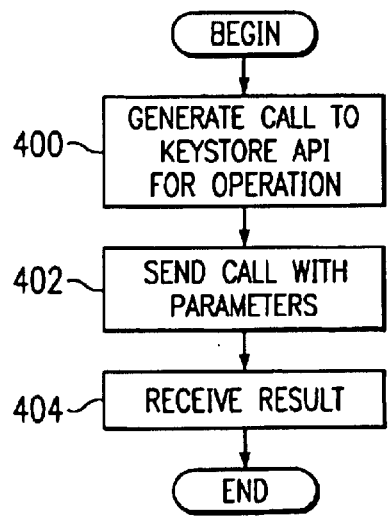
FIG. 4 is a flowchart of a process used by an application to perform operations involving keys in accordance with a preferred embodiment of the present invention.

With reference now to FIG. 4, a flowchart of a process used by an application to perform operations involving keys is depicted in accordance with a preferred embodiment of the present invention. In this example, application 300 in FIG. 3, and the keystore API may be an API in keystore APIs 302 in FIG. 3.

The process begins by generating a call to a keystore API for an operation (step 400). This operation may be, for example, a sign operation. The application would identify or point to the key to be used in the sign operation and provide the data for the sign operation. The call is then sent with the parameters to the keystore API (step 402). A result is received (step 404) with the process terminating thereafter. The application is not required to know the calling semantics used to call the security services in CDSA. Further, any handling of the keys, updating of data in keystores, cleaning up, or releasing memory after operations is handled by the keystore APIs, rather than the application. In this manner, application developers are not required to know the calling semantics for security services. In addition, the application developer is not required to include processes in the application to actually manage the keys and perform cryptographic operations through CDSA. The keystore APIs provide the interface to reduce the complexity of the application.

Figure 5:
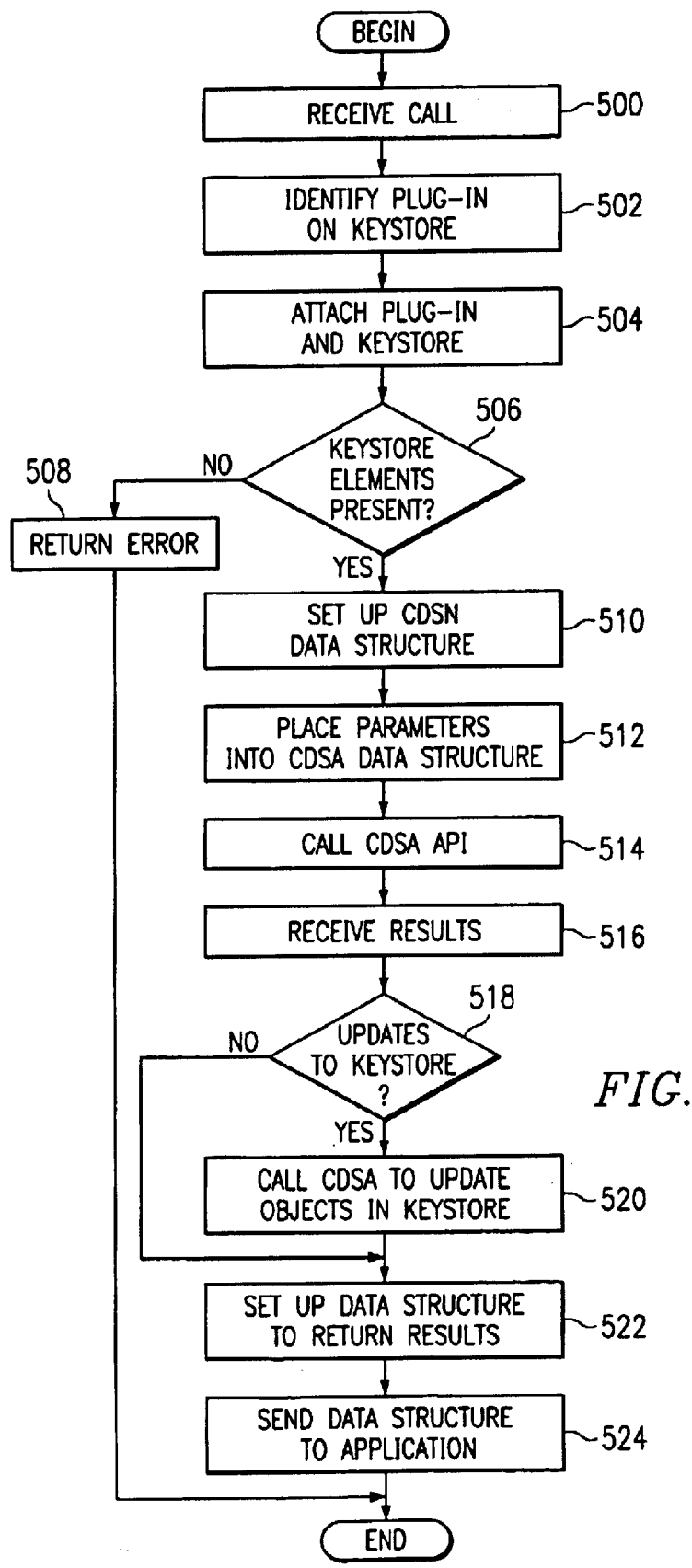
FIG. 5 is a flowchart of a process for use in handling calls from an application in accordance with a preferred embodiment of the present invention.
Figure 5:
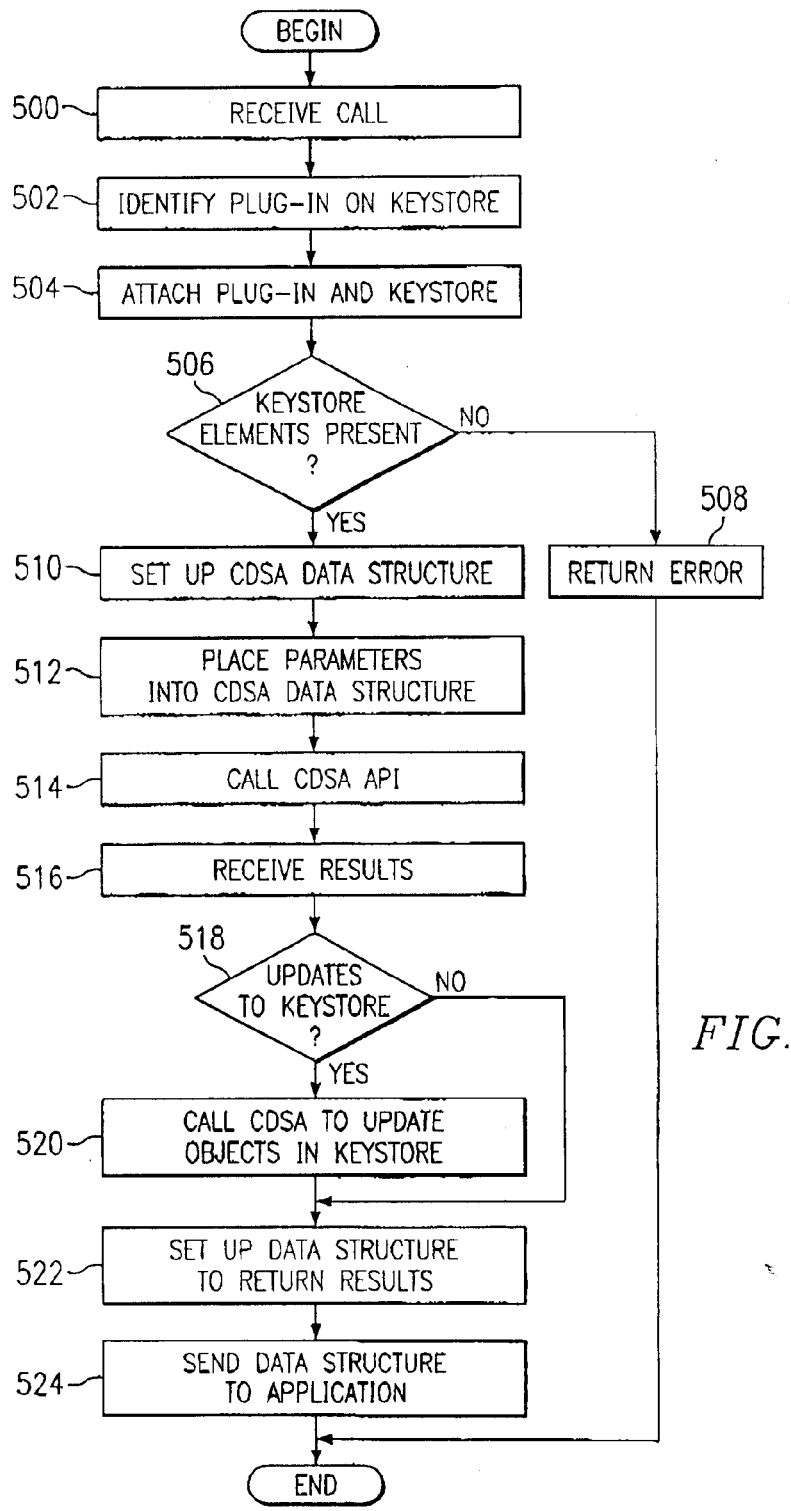

With reference now to FIG. 5, a flowchart of a process for use in handling calls from an application is depicted in accordance with a preferred embodiment of the present invention. The processes, in this example, involve handling a call from an application, such as application 300 in FIG. 3, by keystore APIs, such as keystore APIs 302 in FIG. 3.

The process begins by receiving a call from an application (step 500). The call involves receiving a name of an operation or function and parameters to be used in the operation or function. A plug-in and keystore are identified (step 502). This step involves identifying the plug-in that will handle the operation, as well as the keystore containing one or more keys for the operation. The keystore, in these examples, may take many forms, such as, for example, a virtual keystore, a keystore located in hardware within the data processing system, or a keystore located in a removable device, such as a smart card.

The identification of the plug-in and the keystore may be made by querying a data structure, such as a configuration file containing the information. This configuration file may be a static one, which is always used with the particular application. Alternatively, the configuration file may be modified when new plug-ins or new keystores are added or exchanged for existing ones. In addition, the selection of the plug-in and keystore may be dynamic in which the call may contain an identification of the plug-in or keystore. Further, the application actually could change the configuration file to identify the plug-in or keystore desired. For example, the configuration file may include a list of keystores present in the data processing system. A flag may be set by the application or by some other mechanism to identify the particular keystore as the one to be used or managed.

Next the plug-in and keystore are attached (step 504). This step is made using a standard attach call to CDSA layer. A determination is then made as to whether the needed keystore elements are present to perform the requested operation (step 506). For example, this step may ensure that a private key object is present in the identified keystore before creating and sending a call for a sign operation with a private key to the CDSA layer.

If the needed keystore elements are not present, an error is returned to the application (step 508) with the process terminating thereafter. Otherwise, a CDSA data structure is set up (step 510). This step involves creating the appropriate headers needed for the call to the CDSA layer to perform the operation. For example, data types and call types are defined by the headers. Next, parameters or attributes are placed into the CDSA data structure.

A call is then made to the CDSA API corresponding to the operation that is to be performed for the application (step 514). This step involves identifying the appropriate CDSA API that is required to accomplish the requested operation. The call involves sending the CDSA data structure to the appropriate CDSA API. Next, results are received from the call (step 516). A determination is made as to whether any objects in the keystore should be updated based on the results of the call (step 518). When an operation is performed, sometimes objects associated with the key or other object in the operation are affected. In such a case, an update would be necessary. For example, private key attributes in a keystore require updates when a certificate is added. If updates are needed, a call is made to the CDSA layer to update the objects in the keystore (step 520). This update is a step that the application is not required to know about or request. The keystore API manages the keystore in this aspect without requiring the application to include the process.

Then, a data structure is set up to return the results to the application (step 522). The process also proceeds to step 522 if updates to the keystore are unnecessary. The data structure is then returned to the application (step 524) with the process terminating thereafter.

Pseudo code for a function in a keystore API to add a certificate to a keystore in accordance with a preferred embodiment of the present invention is illustrated as follows:

sc_AddCert (
  Get the handle to the keystore database
  Make sure corresponding private key is there
  Get start and end data out of cert to be added (dates are attributes stored in the keystore)
  Calculate the subject attribute for the keystore
  Set up CDSA key headers
  Set up key fields into CDSA attributes
    Key label
    Key identifier (index)
    Value of certificate
    Subject of cert
    Class of object
    Type of object (permanent)
    Certificate type
    Privacy of object (can others see it)
    Issuer of cert
    Certificate serial number
  Call CDSA routine to insert the object
  Update the private key's, subject, label & dates to make sure they correspond w/the certificate
  return result of operation
}

The sc_AddCert function illustrated is used to add a certificate to a keystore. This function obtains the handle to the keystore and ensures that the key involved in the operation is present. The function also sets up the appropriate data structure for a call to the CDSA layer. The function also makes appropriate updates to the keystore in response to the operation and returns the result of the operation to the application. These update operations.

Keystore APIs, in accordance with a preferred embodiment of the present invention, are shown in the following table:

TABLE

| Keystore APIs | |
|---|---|
| Function | Description |
| sc_Init | initialize the keystore memory functions |
| sc_Attach | bind session & login to the keystore |
| sc_Detach | clean up session to the keystore |

TABLE-continued

Keystore APIs

| Function | Description |
|---|---|
| sc_GenerateSaveKeypair | generate a public/private key pairs to keystore |
| sc_CreatePrivateKey | generate and return a private key |
| sc_StorePrivateKeyByLabel | store an externally generated private key and associate with a provided label |
| sc_Sign | Create a signature on the input data with the key in the keystore |
| sc_SignByLabel | Create a signature on the input data referring the signing key by user defined label |
| sc_Verify | Verify a signature with a certificate in the keystore |
| sc_RetrievePrivateKeyInfo | Retrieve information about a private key in the keystore |
| sc_RetrievePrivateKeyInfoByLabel | Retrieve information about a private key in the keystore, referring to the key by a user defined label |
| sc_RetrieveCertInfo | Retrieve information about a certificate in the keystore |
| sc_AddCert | Add a certificate into the keystore and associate it with a private key |
| sc_AddUnattachedCert | Add a certificate into the keystore that is not associated with a private key |
| sc_StoreGenericByLabel | Store a generic user data |
| sc_RetrieveGenericByLabel | Retrieve generic user data |
| sc_DeleteGenericByLabel | Delete generic user data from the keystore |
| sc_GenericList | Retrieve a list of all generic user data objects from the keystore |
| sc_IndexList | Retrieve list of all indexes to keystore keys |
| sc_RetrieveCert | Retrieve a certificate from the keystore |
| sc_DeleteCert | Delete a certificate from the keystore |
| sc_HashPublicKey | Function to perform a hash of the public key to use as a key index |
| sc_CertList | Return a list of certificate indexes in the keystore |
| sc_DeleteCred | Delete all keys and certificates associated with a key index |
| sc_DeleteCredByLabel | Delete all keys and certificates associated with a specified label |
| sc_KeyList | Retrieve a list of all indexes of private keys in the keystore |
| sc_WrapPrivateKey | Encrypt a private key with another key and return it to the caller |
| sc_GetKeyPairList | Get list of private keys with associated public keys |

This table provides an exemplary list of APIs and operations performed by the APIs. These functions or operations may be implemented in a similar manner, as illustrated in the pseudo code for the sc_AddCert function described above. Of course, other functions may be used in addition to or in place of those listed in the table in implementing keystore APIs.

Thus, the present invention provides a method, apparatus, and computer implemented instructions for performing cryptographic operations and managing keystores. The mechanism of the present invention identifies an appropriate plug-in to perform the cryptographic operation or manage the keystore. The mechanism will attach the plug-in, as well as the keystore, and make the appropriate call to execute the operation. Further, any operations needed to perform updates and manage the keystore in response to the operation are identified and performed by the mechanism of the present invention. In this manner, the application is not required to contain the processes for this type of management and is not required to know the location of the keystore or the plug-in that is to be used.

The interface of the present invention, the keystore APIs, allow for operations such as generating a keypair, adding a certificate, deleting a certificate, retrieving a certificate, signing data, verifying a signature, encrypting data, and verifying proof of possession of a private key to occur without requiring the application to handle all of the calls required to perform these operations.

The interface handles activities involving the keystore, such as unwrapping (decrypting) a private key and storing it in the keystore and wrapping (encrypting) a private key to be copied out of the keystore. The application is not required to know where the keystore is located and how to access the keystore. These operations including updating the keystore are handled by the interface of the present invention. The interface of the present invention also, may be used to provide key management utilities such as listing certificates in a keystore, listing certificates with corresponding private keys in a keystore, and deleting keys and certificates for a given key identifier.

Pseudo code for a wrapping operation is illustrated as follows:

```
sc_WrapPrivateKey
{
    Get the CDSA session id and the database handle
    Find the key id of private key, so we can wrap it up later
    Create a CDSA key generation context for the wrapping
        key if it is not specified as a parameter
    Generate a wrapping key
    Delete the context
    Create a CDSA context to wrap the key
    Get information about the key so you know what you need
        to wrap it
```

```
Wrap the key
Delete the Context
Return result
}
```

Pseudo code for obtaining a list of keys is illustrated as follows:

```
sc_KeyList
{
    Get the session id and the database handle
    Initialize the key counter
    Until we run out of keys
        Get the record attributes into local storage
        Increment the counter
    For each of the keys
        Put indexes into the array to return to the caller
    Return result
}
```

In this manner, the mechanism of the present invention allows for translating a PKI keystore semantic into a PKCS#11 type semantics. This mechanism can be applied to other types of security services that provide data and cryptographic services.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, DVD-ROMs, and transmission-type media such as digital and analog communications links, wired or wireless communications links using transmission forms such as, for example, radio frequency and light wave transmissions. The computer readable media may take the form coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. Although the depicted examples illustrate the use of CDSA for the security services, the mechanism of the present invention may be applied to other types of security services. In particular, security services using a framework may be used in with the present invention. The embodiment was chosen and described in order to best explain the principles of the invention, the practical application, and to enable others of ordinary skill in the art to understand the invention for various embodiments with various modifications as are suited to the particular use contemplated.

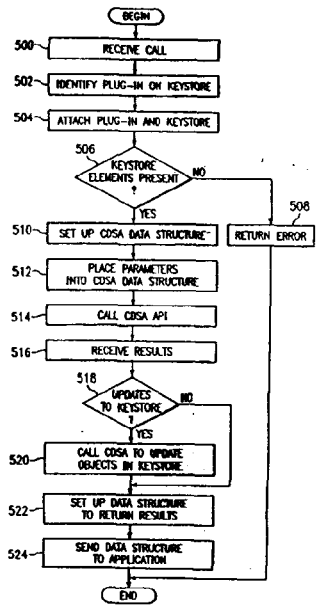

What is claimed is:

1. A method in data processing system for performing an operation using a key comprising;
    receiving a call from an application to perform the operation using the key;
    in response to receiving the call, automatically identifying a routine to perform the operation;
    in response to receiving the call, automatically identifying a keystore containing the key;
    creating a data structure used by the routine to execute the operation, wherein the data structure includes parameters of the call received from the application;
    sending the data structure to the routine, wherein the routine and the keystore are identified using the data structure.

2. The method of claim 1 further comprising:
    determining whether the key is located in the keystore; and
    responsive to the key being absent from the keystore, inhibiting the sending step.

3. The method of claim 1, wherein the data structure is a configuration associated with an application originating the call.

4. The method of claim 1, wherein the keystore is one of a virtual keystore, a keystore, an adapter, and a keystore in a smart card.

5. The method of claim 1, wherein the routine is a Common Data Security Architecture plug-in.

6. The method of claim 1 further comprising initializing the routine prior to sending the data structure to the routine.

7. The method of claim 1, wherein the call is received from an application and further comprising:
    receiving a result from the operation; and
    returning the result to the application.

8. The method of claim 7 further comprising:
    responsive to receiving the result, performing any necessary updates to objects in the keystore.

9. A cryptographic system for use in a data processing system comprising:
    a security layer;
    a plurality of cryptographic routines, wherein the plurality of cryptographic routines are access through the security layer;
    a keystore; and
    a keystore application program interface layer coupled to the security layer, wherein the keystore application program interface layer receives a call from an application to perform a cryptographic operation, in response to receiving the call automatically identifies a routine, calls the routine to perform the cryptographic operation, receives a result from the routine, and returns the result to the application, wherein the routine uses a data structure that includes parameters of the call received from the application to execute the operation, and wherein the routine and the keystore are identified using the data structure.

10. The cryptographic system of claim 9, wherein the security layer is a Common Data Security Architecture layer.

11. The cryptographic system claim 9, wherein the plurality of cryptographic routines are a plurality of plug-ins.

12. The cryptographic system of claim 9, wherein the keystore is one of a plurality of keystores and wherein the keystore application program interface layer identifies the keystore from the plurality of keystores.

13. The cryptographic system of claim 9, wherein the routine and the keystore are identified in the data processing system accessed by the keystore application program interface layer.

14. The cryptographic system of claim 9, wherein the keystore application program interface layer performs updates to the keystore in response to receiving the result from the routine.

15. The cryptographic system claim 9, wherein the keystore application program interface layer initializes the routine used to perform the cryptographic operation.

16. A data processing system for performing an operation using a key comprising;
    receiving means for receiving a call from an application to perform the operation using the key;

in response to receiving the call, first identifying means for automatically identifying a routine to perform the operation;

in response to receiving the call, second identifying means for automatically identifying a keystore containing the key;

creating means for creating a data structure used by the routine to execute the operation, wherein the data structure includes parameter of the call received from the application;

sending means for sending the data structure to the routine, wherein the routine and the keystore are identified using the data structure.

17. The data processing system of claim 16 further comprising:

determining means for determining whether the key is located in the keystore; and responsive to the key being absent from the keystore, for inhibiting the sending step.

18. The data processing system of claim 16, wherein the data structure is a configuration associated with an application originating the call.

19. The data processing system of claim 16, wherein the keystore is one of a virtual keystore, a keystore, an adapter, and a keystore in a smart card.

20. The data processing system of claim 16, wherein the routine is a Common Data Security Architecture plug-in.

21. The data processing system of claim 16 further comprising initializing the routine prior to sending the data structure to the routine.

22. The data processing system of claim 16, wherein the call is received from an application, and wherein the receiving means is a first receiving means, further comprising:

second receiving means for receiving a result from the operation; and returning means for returning the result to the application.

23. The data processing system of claim 22 further comprising:

performing means responsive to receiving the result, for performing any necessary updates to objects in the keystore.

24. A computer program product in a computer readable medium for performing an operation using a key, the computer program product comprising;

first instructions for receiving a call from an application to perform the operation using the key;

in response to receiving the call, second instructions for automatically identifying a routine to perform the operation;

in response to receiving the call, third instructions for automatically identifying a keystore containing the key;

fourth instructions for creating a data structure used by the routine to execute the operation, wherein the data structure includes parameters of the call received from the application;

fifth instructions for sending the data structure to the routine, wherein the routine and the keystore are identified using the data structure.

* * * * *

UNITED STATES PATENT AND TRADEMARK OFFICE
CERTIFICATE OF CORRECTION

PATENT NO. : 6,839,437 B1
APPLICATION NO. : 09/494876
DATED : January 4, 2005
INVENTOR(S) : Crane et al.

It is certified that error appears in the above-identified patent and that said Letters Patent is hereby corrected as shown below:

The title page showing the illustrative figure should be deleted to be replaced with the attached title page.

The drawing sheet, consisting of Fig. 5, should be deleted to be replaced with drawing sheet, consisting of Fig. 5, as shown on the attached page.

Col. 12, line 30: after "routines are" delete "access" and insert --accessed--.

Col. 13, line 9: after "includes" delete "parameter" and insert --parameters--.

Signed and Sealed this

Twenty-fourth Day of October, 2006

JON W. DUDAS
*Director of the United States Patent and Trademark Office*

(12) United States Patent
Crane et al.

(10) Patent No.: US 6,839,437 B1
(45) Date of Patent: Jan. 4, 2005

(54) METHOD AND APPARATUS FOR MANAGING KEYS FOR CRYPTOGRAPHIC OPERATIONS

(75) Inventors: Michael A. Crane, Austin, TX (US); Sohail H. Malik, Gaithersburg, MD (US); John Clay Richard Wray, Chelmsford, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/494,876

(22) Filed: Jan. 31, 2000

(51) Int. Cl.⁷ .............................................. H04L 9/00
(52) U.S. Cl. .................. 380/286; 380/277; 380/282; 713/167; 713/171; 713/172
(58) Field of Search ........................... 380/286, 282, 380/277, 45; 713/175, 187, 159, 167, 171, 172, 163

(56) References Cited

U.S. PATENT DOCUMENTS

| | | | |
|---|---|---|---|
| 5,513,261 A | * | 4/1996 | Maher ..................... 380/277 |
| 5,748,736 A | * | 5/1998 | Mittra ..................... 713/163 |
| 6,625,734 B1 | * | 9/2003 | Marvit et al. ............ 713/201 |
| 6,711,264 B1 | * | 3/2004 | Matsumoto et al. ...... 380/283 |

OTHER PUBLICATIONS

Sun Microsystems. "How to Implement a Provider for the Java Cryptography Architecture", Sep. 1998.*
Sun Microsystems. "keytool—Key and Certificate Management Tool", 1998 (part of Java 1.2).*
Wood, Matthew. "The CSSM PKCS #11 Adaptation Layer", Oct. 1998.*
Knudsen, Jonathan, Java Cryptography, O'Reilly & Associates 1998, p. 79.*
Intel Corporation, Common Security Services Manager. Service Provider Interface (SPI) Specification, Release 1.0, Oct. 1996.*
Intel Corporation,"Intel's Common Data Security Architecture", Dec. 11, 1996.*
Sun Microsystems, Java Platform 1.2 (3 documents): "jarsigner–JAR Signing and Verification Tool", "Java Platform 1.2 API Specification: Class KeyStore" and "The Java Virtual Machine Specification", § 2.10 and § 3.6.*

* cited by examiner

*Primary Examiner*—Gregory Morse
*Assistant Examiner*—Michael J. Simitoski
(74) *Attorney, Agent, or Firm*—Duke W. Yee; Jeffrey S. LaBaw; Stephen J. Walder, Jr.

(57) ABSTRACT

A cryptographic system for use in a data processing system. The system includes a security layer and a plurality of cryptographic routines, wherein the plurality of cryptographic routines are accessed through the security layer. Also included is a keystore and a keystore application program interface layer coupled to the security layer. The keystore application program interface layer receives a call from an application to perform a cryptographic operation, identifies a routine, calls the routine to perform the cryptographic operation, receives a result from the routine, and returns the result to the application.

24 Claims, 3 Drawing Sheets